Feb. 20, 1923.
W. C. HEDGCOCK
BRAKE BEAM FULCRUM
Filed Aug. 8, 1921
1,446,042
2 sheets-sheet 2
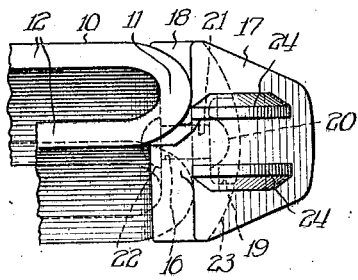
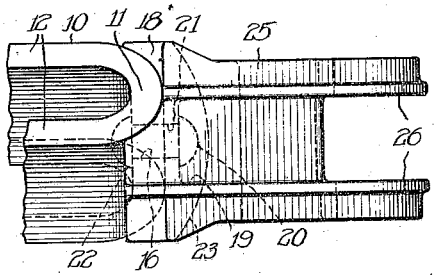
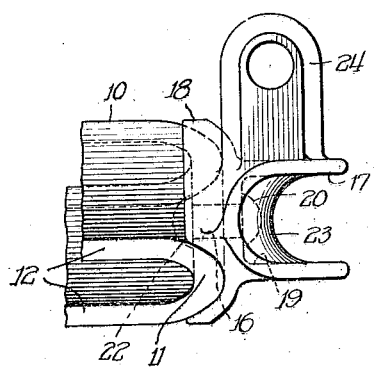
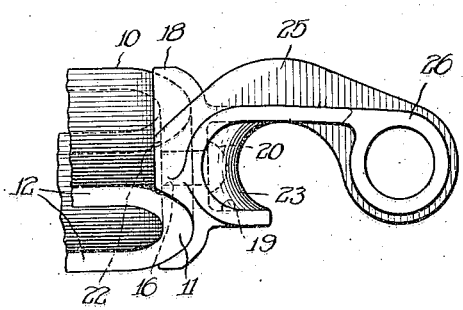
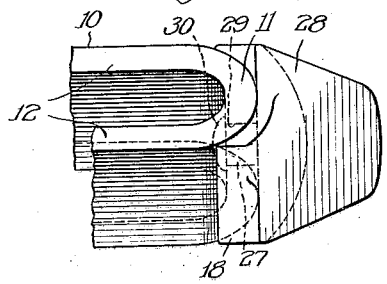
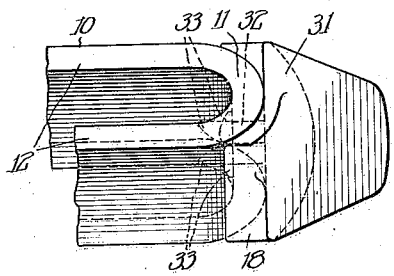

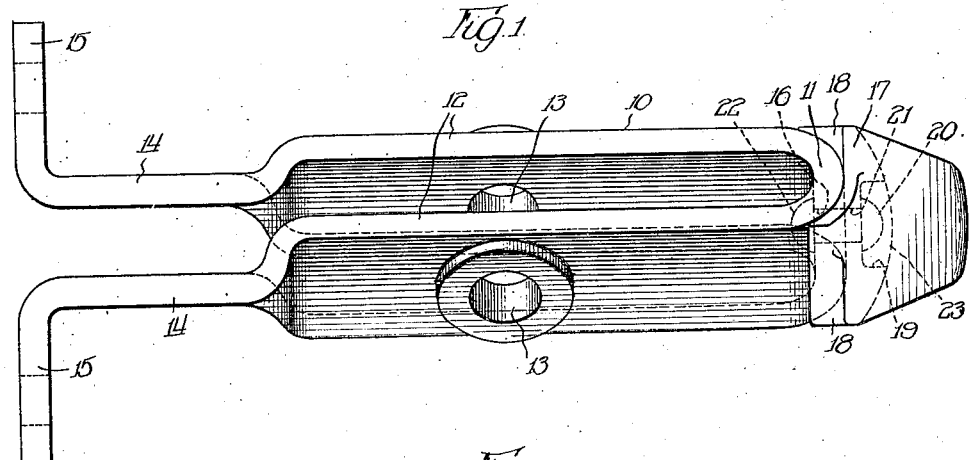
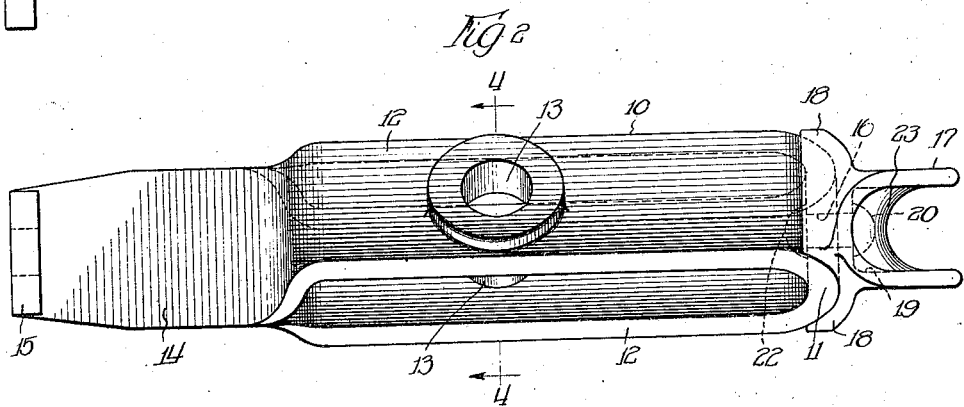
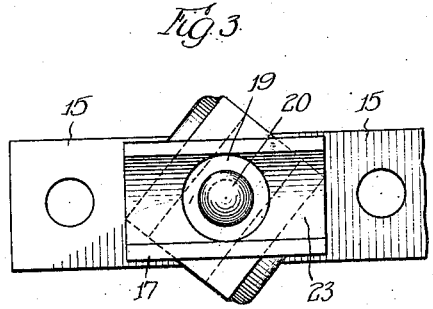
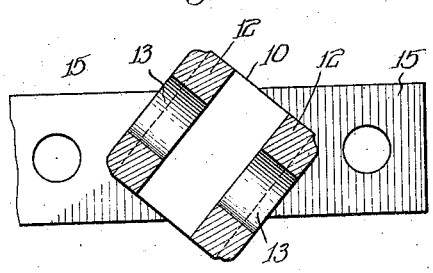

Patented Feb. 20, 1923.

1,446,042

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-BEAM FULCRUM.

Application filed August 8, 1921. Serial No. 490,504.

*To all whom it may concern:*

Be it known that I, WILLIAM C. HEDGCOCK, a citizen of the United States, residing at Chicago, in the county of Cook and State of Illinois, have invented certain new and useful Improvements in Brake-Beam Fulcrums, of which the following is a specification.

This invention relates to brake beam fulcrums.

The trade requires brake beam fulcrums, the tension rod saddles of which varies considerably in shape and dimensions both with and without lugs or attachment means for a center suspension hanger. The main body portion of the fulcrum, however, remains substantially the same. Accordingly, the manufacture of fulcrums can be greatly simplified by providing a standard fulcrum body portion and attaching thereto tension rod saddles of the various types required. Preferably the main body portion of the fulcrum is made in one piece of forging material, which is amply strong for all service requirements, and which if unavoidably deformed in service may be easily reformed.

One object of the invention is to provide a brake beam fulcrum in which different types of tension rod saddle members may be secured to the main body portion of the fulcrum in a manner to meet all the requirements of service conditions.

Another object is to provide a simple, durable and efficient brake beam fulcrum in which the parts co-operate to produce the best results.

These and other objects are accomplished by means of the arrangements disclosed on the accompanying sheets of drawings, in which—

Figure 1 is a top plan view of a brake beam fulcrum embodying my invention;

Figure 2 is a side elevation of the same;

Figure 3 is a front elevation of the same fulcrum;

Figure 4 is a sectional view taken in the plane of line 4—4 of Figure 2;

Figures 5 and 6 are a fragmentary side elevation and top plan view respectively of a brake beam fulcrum showing a tension rod seat having hanger attachment means;

Figures 7 and 8 are a fragmentary side elevation and top plan view respectively, showing a modified type of attachment means for a center suspension hanger; and Figures 9 and 10 are fragmentary top plan views respectively, of a brake beam fulcrum showing different modified means for attaching a tension rod saddle to the main body portion of the fulcrum.

The various novel features of the invention will be apparent from the following description and drawings and will be particularly pointed out in the appended claims.

Referring to the figures of the drawings, it will be noted that the main body portion 10 of the fulcrum is in the form of a single strip of metal bent at its middle point 11, forming spaced arms 12 for the reception of a brake beam lever which may be pivoted to the arms by a pivot pin, not shown, received in the pin openings 13. The arms 12 are offset angularly with respect to the rear portions 14 of the arms which terminate in laterally extending feet 15 whereby the fulcrum may be secured to the compression member of the brake beam.

In all of the figures of the drawings it will be noted that the curved end 11 of the fulcrum is provided with an aperture 16 through which a rivet may extend for attaching the tension rod saddle to the main portion of the brake beam fulcrum.

Referring particularly to Figures 1 and 2 of the drawings it will be noted that a tension rod saddle 17 is provided with curved rearwardly extending wings or bearing portions 18 which embrace and conform to the curved portion 11 of the main body portion of the fulcrum 10 for retaining the saddle 17 against any tendency toward rotation on the main fulcrum body portion 10. This also insures the center line of the rod saddle fitting at the proper angle in relation with the angular center line of the lever slot between the arms 12. In connection with the arrangement shown in Figures 1 and 2 the saddle is provided with a depressed portion or pocket 19 for the reception of the head 20 of a rivet which extends through the aligned openings 16 and 21 in the body portion 10 of the fulcrum and the saddle 17, the inner head 22 of the rivet being upset to rigidly secure the parts together, as shown. With the rivet head 20 located in the pocket 19 there is no engagement or interference between the rivet head 20 and the tension rod which occupies the tension rod seat 23 of the saddle 17.

Precisely the same arrangement is shown in Figures 5 and 6 with the exception that the tension rod saddle is provided with upstanding lugs 24 for the attachment of a center suspension hanger, not shown.

In Figures 7 and 8 a further modified form of tension rod saddle 25 is shown provided with lugs 26 for attachment of a center suspension hanger.

In Figure 9 the same arrangement as shown in Figures 1 and 2 respectively, is disclosed with the exception that the rivet 27 is formed integrally with the tension rod saddle 28 and extends through the opening 29 in the body portion of the fulcrum and is then upset to form a securing head 30.

In Figure 10 a further modification is shown in which a tension rod saddle 31 is provided with an integrally formed projection 32 with portions 33 which may be bent over to secure the saddle 31 to the main body portion of the fulcrum.

It is my intention to cover all modifications of the invention falling within the spirit and scope of the following claims.

I claim:

1. A brake beam fulcrum comprising a main body portion in the form of a strip of metal bent intermediate its ends to provide a rounded front end and means whereby one of a plurality of separate tension rod saddles of different designs may be secured to said rounded front end.

2. A brake beam fulcrum comprising a main body portion in the form of a strip of metal bent intermediate its ends to form two parallel arms between which a brake lever may be mounted, a separate tension rod saddle having a bearing surface conforming to the bent end of the main body portion to prevent rotation of the saddle on said main body portion, and means for securing said saddle to said main body portion.

Signed at Chicago, Illinois, this 2nd day of August, 1921.

WILLIAM C. HEDGCOCK.